United States Patent [19]
Yajima et al.

[11] Patent Number: 5,546,126
[45] Date of Patent: Aug. 13, 1996

[54] TELEVISION CAMERA LENS DIAGNOSTIC SYSTEM

[75] Inventors: Shinya Yajima; Nobuharu Nagashima, both of Saitama-ken, Japan

[73] Assignee: Fuji Photo Optical Co., Ltd., Saitama-ken, Japan

[21] Appl. No.: 228,278

[22] Filed: Apr. 15, 1994

[30] Foreign Application Priority Data

| Apr. 16, 1993 | [JP] | Japan | 5-089640 |
| Mar. 18, 1994 | [JP] | Japan | 6-049290 |
| Mar. 18, 1994 | [JP] | Japan | 6-49291 |

[51] Int. Cl.⁶ .......................... H04N 17/00; H04N 5/225
[52] U.S. Cl. ............................................ 348/175; 348/207
[58] Field of Search ............................ 354/412; 348/143, 348/144, 207, 175, 176; H04N 17/00, 5/225

[56] References Cited

U.S. PATENT DOCUMENTS

| 4,315,232 | 5/1994 | Stewart | 324/72 |
| 4,763,149 | 8/1988 | Takahashi | 354/412 |
| 4,780,734 | 10/1988 | Ogawa et al. | 354/412 |
| 4,914,465 | 4/1990 | Saegusa et al. | 354/412 |
| 5,138,459 | 8/1992 | Roberts et al. | 348/232 |
| 5,225,865 | 7/1993 | Shiomi et al. | 354/412 |

FOREIGN PATENT DOCUMENTS

| 5109098 | 5/1993 | Japan | H04N 5/232 |

OTHER PUBLICATIONS

Motorola Semiconductor Technical Data, Linear & Interface Integrated Circuits Rev. 3 1990, MC33035.

*Primary Examiner*—Michael Horabik
*Assistant Examiner*—Michael Day
*Attorney, Agent, or Firm*—Sixbey, Friedman Leedom & Ferguson; Gerald J. Ferguson, Jr.; Evan R. Smith

[57] ABSTRACT

A television camera lens diagnostic system for diagnosing the state of operation of a movable mechanism in a lens unit has a start button which generates a start signal for commanding initiation of the diagnosis when pushed and a diagnostic action commanding circuit commands the movable mechanism to take a predetermined action for the diagnosis upon receipt of the start signal. Potentiometers detects the actual action of the movable mechanism and a microcomputer determines whether the movable mechanism has trouble on the basis of the actual action of the movable mechanism detected by the potentiometers and the extent and the condition of the trouble are displayed.

13 Claims, 13 Drawing Sheets

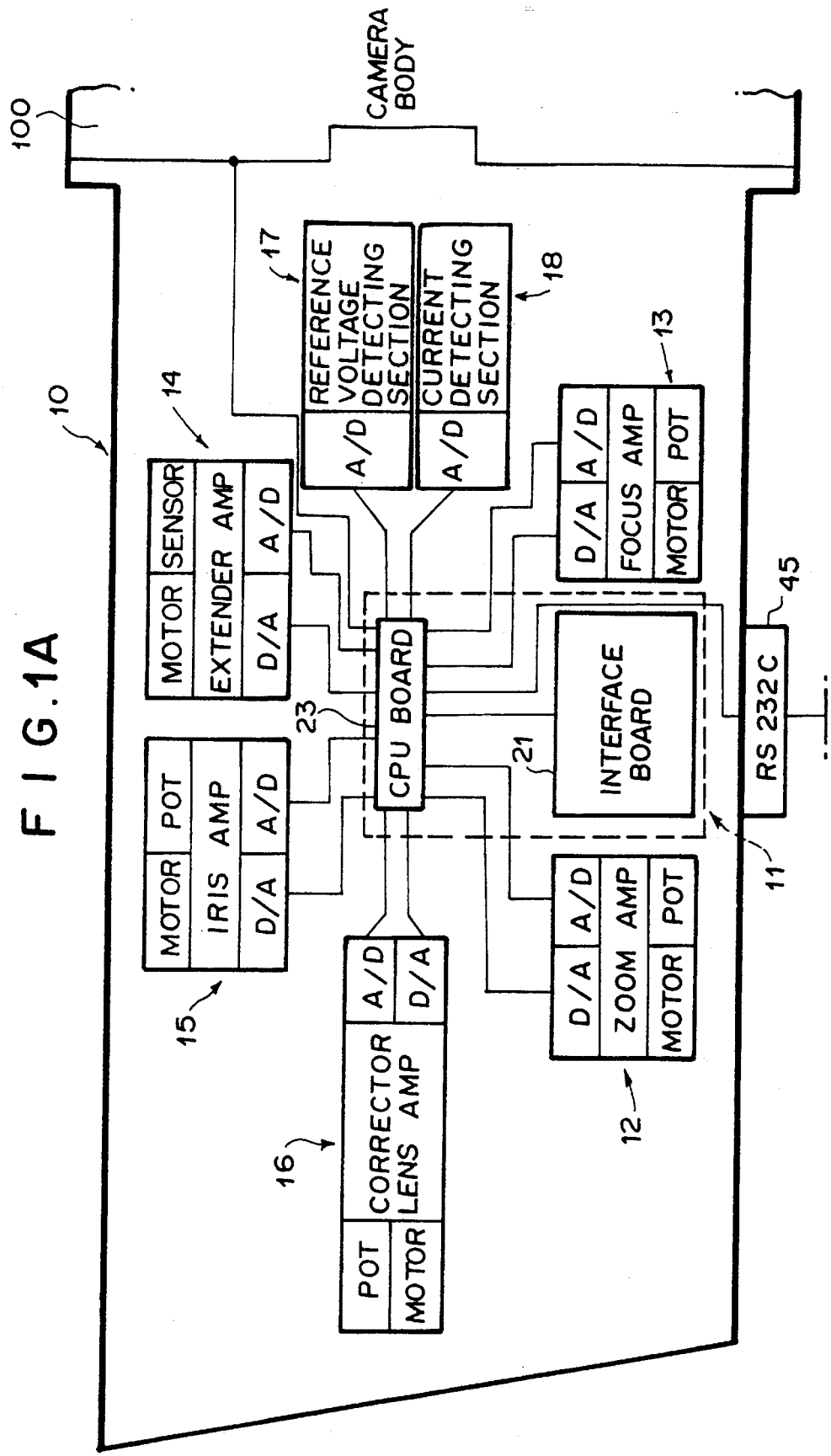

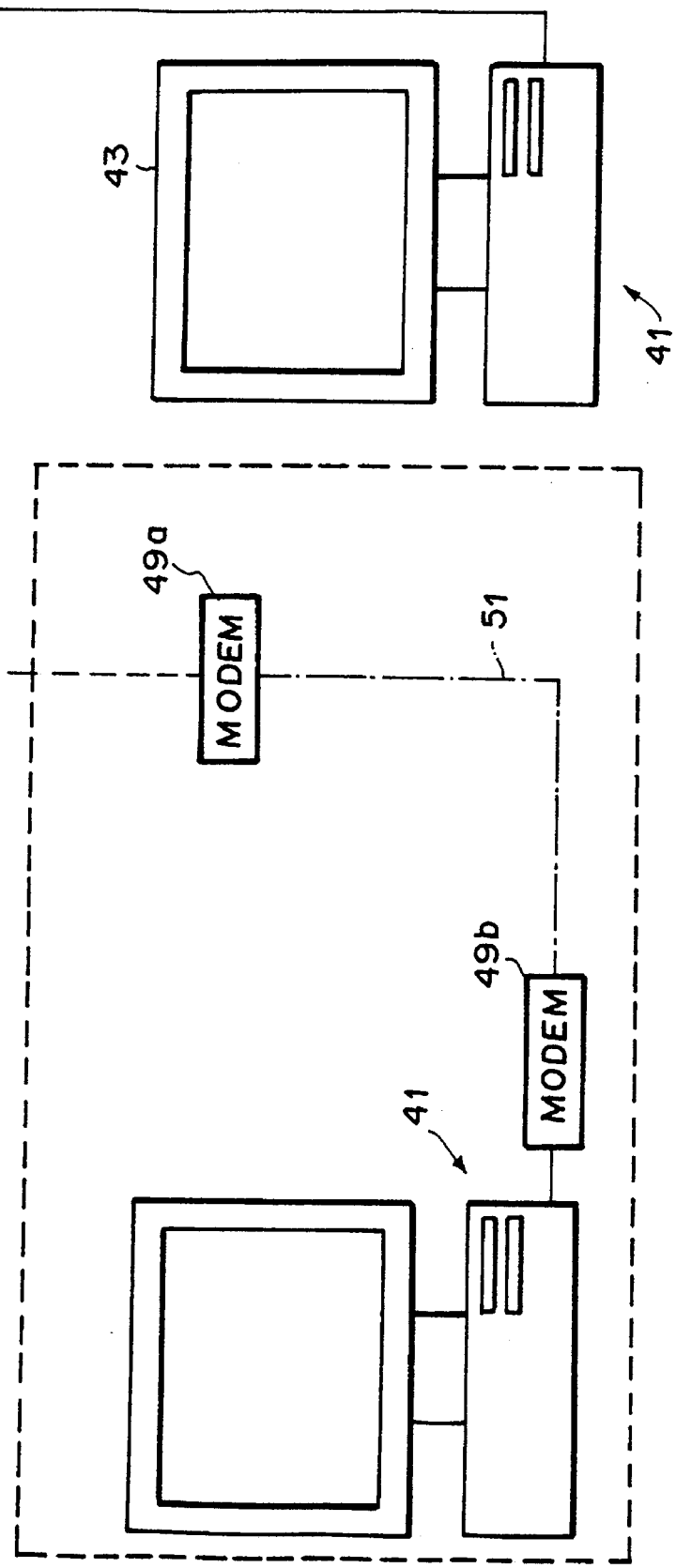

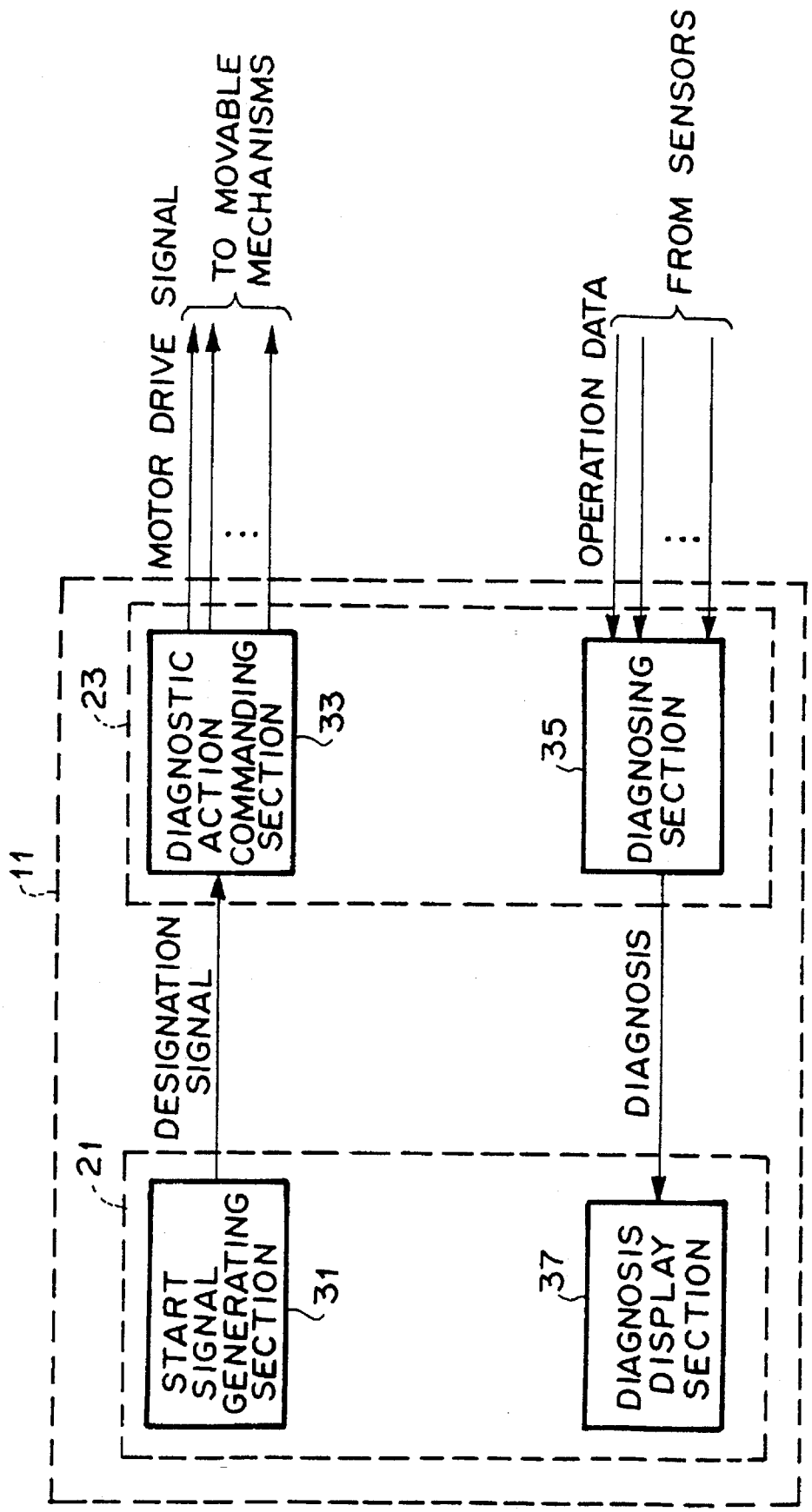

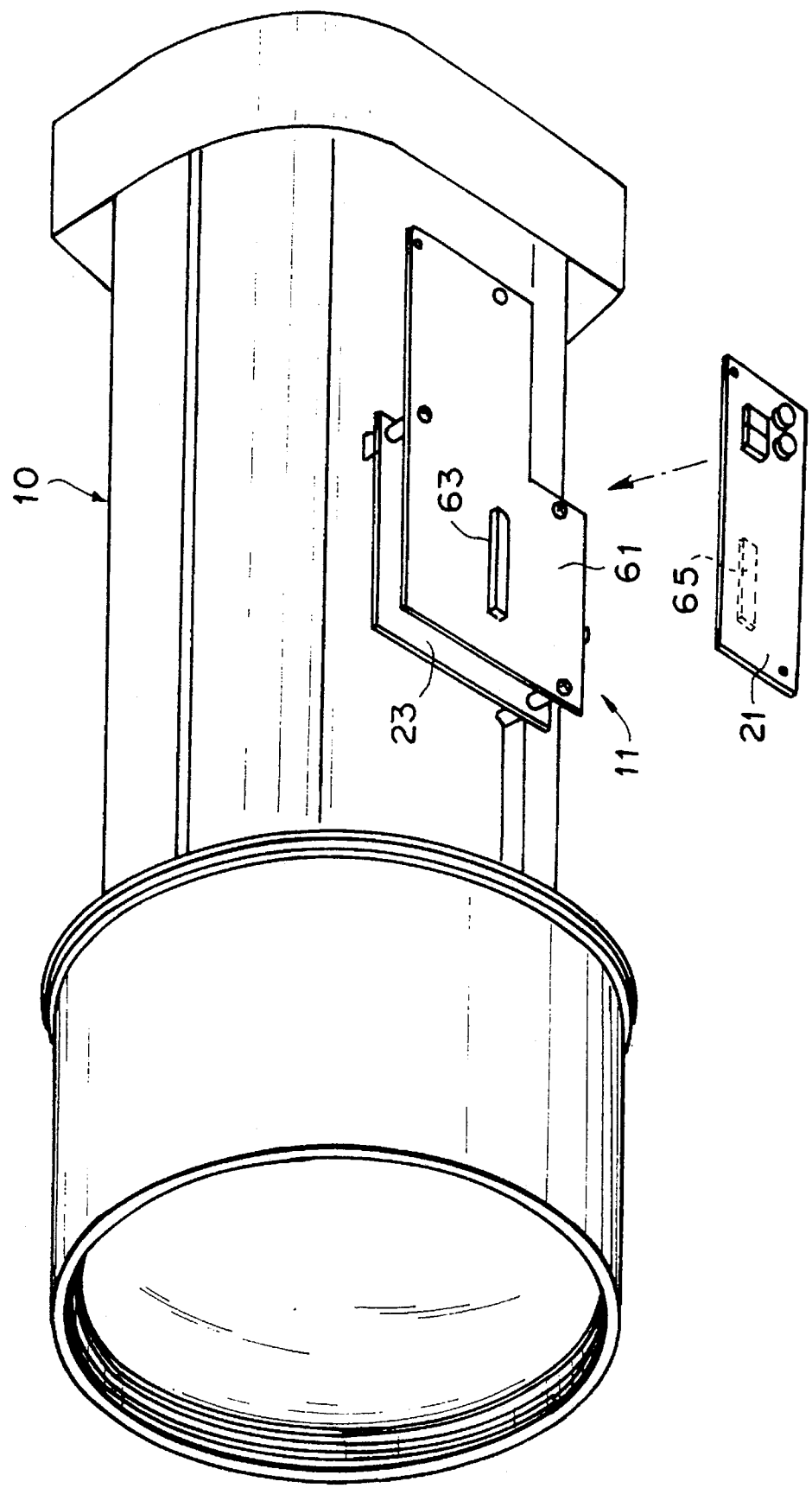

TELEVISION CAMERA LENS DIAGNOSTIC SYSTEM

BACKGROUND OF THE INVENTION

1. Field of the Invention

This invention relates to a television camera lens diagnostic system, and more particularly to a system for diagnosing the state of movable mechanism in a television camera lens such as a focusing mechanism, a zoom mechanism and the like.

2. Description of the Prior Art

In a TV camera used in a television station and the like, a lens unit having therein a plurality of movable mechanisms such as a focusing mechanism, a zoom mechanism, an iris mechanism and the like is mounted on the front side of the camera. Since the state of operation of these movable mechanisms immediately affects the image quality, the state of operation of the movable mechanisms must be constantly checked.

However since a large number of cameras are used in the TV station and further each lens unit has a substantial number of movable mechanisms, checking the state of the operation of the movable mechanisms is very troublesome.

The system disclosed in Japanese Patent Application No. 5(1993)-109098 discloses a zoom lens that is moved from telephoto to wide-angle positions. The moving speed, value of electric current, and the like are measured in predetermined positions during operation to detect failures. If an error is detected, a failure condition is indicated.

The system can save labor of the operator and shorten the time for checking. Further when such checking is made by an unskilled operator, reliability of the checking can be improved by use of the system.

However, if there is found any trouble, it will be helpful to know the specific part or sub-unit where trouble exists. For example, since in the case of the lens unit for a TV camera, trouble can develop in various parts, such as a signal input circuit, amplifiers, electric motors, mechanical parts, and the like, it will be helpful when the operator can know the troubled part at a glance.

Further, the lens unit need not be perfect in practical use depending on the extent of the trouble, the part of trouble or the way of use. For example, in the case of a zoom lens, depending on the shooting situation, the cameraman's sense or the like, the lens is used only in a part of its focal length range. In such a case, trouble in the zooming system outside the use focal length range does not cause any problem in practical use, and accordingly, the trouble may be taken care of later.

Further even if the driving current for the lens driving motor deviates from the reference value, it sometimes causes no problem in practical use.

The same is true of other movable mechanisms such as the focusing mechanism, the extender mechanism, the iris mechanism and the like.

SUMMARY OF THE INVENTION

In view of the foregoing observations and description, the primary object of the present invention is to provide a television camera lens diagnostic system which can indicate the movable mechanism having trouble, the modality of the trouble and/or the extent of the trouble.

In accordance with the present invention, there is provided a television camera lens diagnostic system for diagnosing the state of operation of movable mechanisms in a lens unit for a television camera comprising a start signal generating means which generates a start signal for commanding initiation of the diagnosis, a diagnostic action commanding means which commands the movable mechanisms to take a predetermined action for the diagnosis upon receipt of the start signal, a detecting means for detecting the actual action of the movable mechanisms, a determining means for determining whether the movable mechanisms have trouble on the basis of comparison of the data on the actual action of each of the movable mechanisms detected by the detecting means with reference data on the predetermined action for the diagnosis, and an indicating means which indicates the movable mechanism determined to have trouble.

BRIEF DESCRIPTION OF THE DRAWINGS

FIG. 1, which constitutes FIGS. 1A and 1B taken together, is a block diagram showing the television camera lens diagnostic system in accordance with a first embodiment of the present invention, FIG. 2 is a block diagram conceptually showing the arrangement of the diagnostic system, FIG. 3 is a perspective view showing the lens unit attached with the self-diagnostic interface board with the lens cover removed.

DESCRIPTION OF THE PREFERRED EMBODIMENTS

Figure 4:
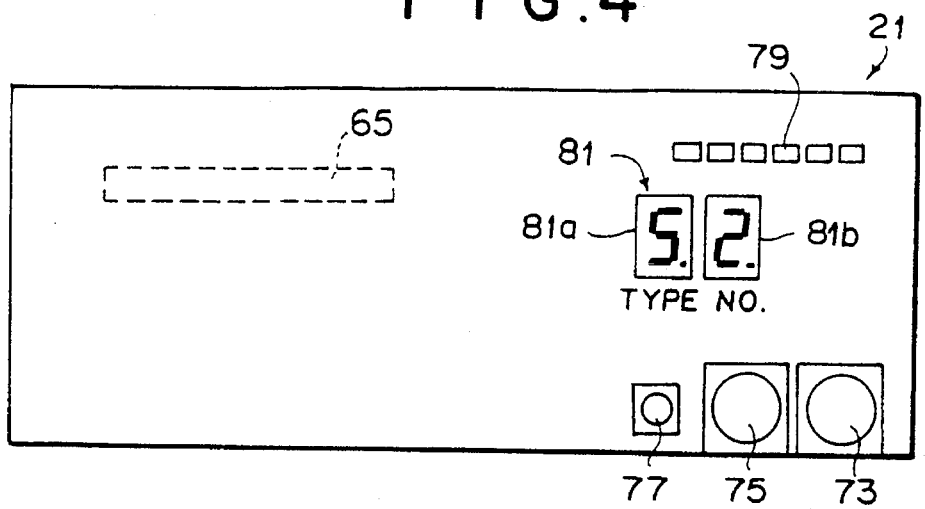
FIG. 4 is a schematic view showing an important part of the self-diagnostic interface board.

In the following embodiments, the television camera lens diagnostic system is provided in a lens unit mounted on the front side of a camera body supported on a pan head for panning and tilting.

In FIG. 1, reference numeral 10 denotes a lens unit 10 mounted on a camera body 100. As shown in FIG. 1, a lens diagnostic system 11 in accordance with an embodiment of the present invention comprises a self-diagnostic interface board 21 and a CPU (central processing unit) board 23. A zoom lens drive mechanism 12, a focusing lens drive mechanism 13, an extender lens drive mechanism 14, an iris drive mechanism 15, a correcting lens drive mechanism 16, a reference voltage detecting section 17 and a current detecting section 18 whose states of operation are to be diagnosed are electrically connected to the CPU board 23.

Each of the drive mechanisms 12 to 16 is provided with an A/D converter, an amplifier, a drive motor, a potentiometer (or a sensor) and a D/A converter, and drives the motor in response to a motor drive signal from the CPU of the CPU board 23. Further, each drive mechanism detects the position (and the moving speed if necessary) of the lens or the iris at a predetermined timing while the lens or the iris is being driven by the motor and outputs the data obtained to the CPU.

Each of the reference voltage detecting section 17 for detecting the reference voltage of a power source and the current detecting section 18 for detecting the output current of the power source is provided with an A/D converter for converting the reference voltage or the output current detected to a digital value, which is input into the CPU. Thus, those skilled in the art will appreciate from this description that the current detecting section 18 provides a means for the CPU to detect drive current.

As shown in FIG. 2, the lens diagnostic system 11 conceptually comprises a start signal generating section 31 which outputs a designation signal which represents the movable mechanisms (the drive mechanisms and the sections) to be checked designated by an operator and at the same time commands start of diagnosis, a diagnostic action commanding section 33 which outputs motor drive signals to the movable mechanisms designated by the designation signal upon receipt of the designation signal, a diagnosing section 35 which receives operation data from sensors which detects the states of operation of the designated movable mechanisms and determines whether the movable mechanisms are normal on the basis of comparison of the operation data and reference data, and a diagnosis display section 37 which displays whether the movable mechanisms are normal or have trouble and the extent of trouble if any.

The start signal generating section 31 and the diagnosis display section 37 are provided on the self-diagnostic interface board 21 and the diagnostic action commanding section 33 and the diagnosing section 35 are formed by a program stored in a ROM on the CPU board 23.

As shown in FIG. 3, the self-diagnostic interface board 21 is removably mounted on the lens unit 10. In FIG. 3, the lens cover of the lens unit 10 is removed.

That is, the CPU board 23 and a mother board 61 are mounted on the outer wall of the lens unit 10 with the mother board 61 disposed outside the CPU board 23. The mother board 61 is provided with a connector 63 which is electrically connected to the CPU board 23 and a connector 65 of the self-diagnostic interface board 21 is mated with the connector 63 of the mother board 61.

The self-diagnostic interface board 21 may be mounted on the lens unit 10 when the lens unit 10 is to be checked. In this case, the self-diagnostic interface board 21 need not be provided one for one lens unit 10.

The self-diagnostic interface board 21 will be described in more detail with reference to FIG. 4, hereinbelow.

As shown in FIG. 4, a start button 73, a stop button 75, a selector switch 77, a trouble extent display section 79, a diagnostic item display section 81, the connector 65, LED drivers (not shown) and the like are mounted on the self-diagnostic interface board 21.

The selector switch 77 is a 4-bit 16-contact DIP switch and the movable mechanisms to be checked are designated by the position of the selector switch 77 as shown in the following table. In the following table, the numbers in the left column represent the positions of the selector switch 77.

| | |
|---|---|
| 0 | check all the movable mechanisms and the power source |
| 1 | check voltage and current of the reference power source |
| 2 | check operation of the switches |
| 3 | check the iris |
| 4 | check the extender lens |
| 5 | check the zoom lens |
| 6 | check the focusing lens |
| 7 | check the corrector lens |
| 8–F | not used |

When the selector switch 77 is in position 0, all the movable mechanisms and the power source are to be checked in sequence, and the selector switch 77 is in one of the positions 1 to 7, only the part corresponding to the position is to be checked.

When the start button 73 is pushed after the parts to be checked are selected by operation of the selector switch 77, the designation signal is input into the diagnostic action commanding section 33 and the diagnosis is started, i.e., the CPU begins to execute a self-diagnostic subroutine which will be described later. The stop button 75 is for interrupting the diagnosis and when the stop button 75 is pushed while the CPU is executing the self-diagnostic subroutine, the CPU interrupts the subroutine and returns to the main routine for controlling the lens unit 10 in the normal mode. It is preferred that the start button 73 and the stop button 75 are colored in different colors, e.g., respectively in green and red, in order to easily distinguish them from each other.

The diagnostic item display section 81 comprises a pair of seven-segment LED display elements 81a and 81b. The left display element 81a displays a digit which indicates the part currently checked and the right display element 81b displays a digit which indicates the sub-unit in which the trouble is found. The digits displayed by the left element 81a to indicate the part currently checked correspond to the numbers of the positions of the selector switch 77. In the right element 81b, digit 1 represents trouble with the input signal generating circuit for the part currently checked, digit 2 represents trouble with the amplifier, digit 3 represents trouble with the motor and digit 4 represents trouble with the mechanical part. For example, that the left element 81a displays digit 5 and the right element 81b displays 2 means that the zoom lens is being checked and trouble with the amplifier has been found. When there has been found no trouble, the right element 81b displays digit 0.

The trouble extent display section 79 comprises one green LED, two yellow LEDs and three red LEDs. When the CPU determines that the part currently checked is normal, the green LED is turned on, when the CPU determines that the part currently checked requires adjustment though it may be used for the time being, one or two of the yellow LEDs is turned on and when the CPU determines that the part currently checked requires service, one or more of the red LEDs is turned on. As the extent of trouble found increases, a larger number of the yellow or red LEDs are turned on. Thus, those skilled in the art will appreciate from this description that the trouble extent display section 79 provides a means for indicating a significance level of a detected problem.

In this particular embodiment, the lens unit 10 is connected to an operation unit 41 by way of a RS232C connector 45 and a RS232C cable 47. The operation unit 41 is formed by an external controller and a personal computer. The operation unit 41 is arranged to be able to input a designation signal, the same as that output from the start signal generating section 31 shown in FIG. 2, into the diagnostic action commanding section 33 and to receive information from the diagnosing section 35 and display the part currently checked, the sub-unit in which the trouble is found, and the extent of trouble on a CRT 43. That is, in this particular embodiment, the diagnosis can be effected using either the self-diagnostic interface board 21 or the operation unit 41. In the case of using the operation unit 41, a single or a plurality of lens units 10 can be checked by a remote control. When a plurality of lens units 10 are checked by the operation unit 41, diagnoses for the respective lens units 10 may be displayed simultaneously or in sequence. The operation unit 41 may be connected to the lens unit 10 by way of MODEMs 49a and 49b and a public telephone circuit 51 as shown in the area surrounded by the broken line In FIG. 1.

Figure 5:
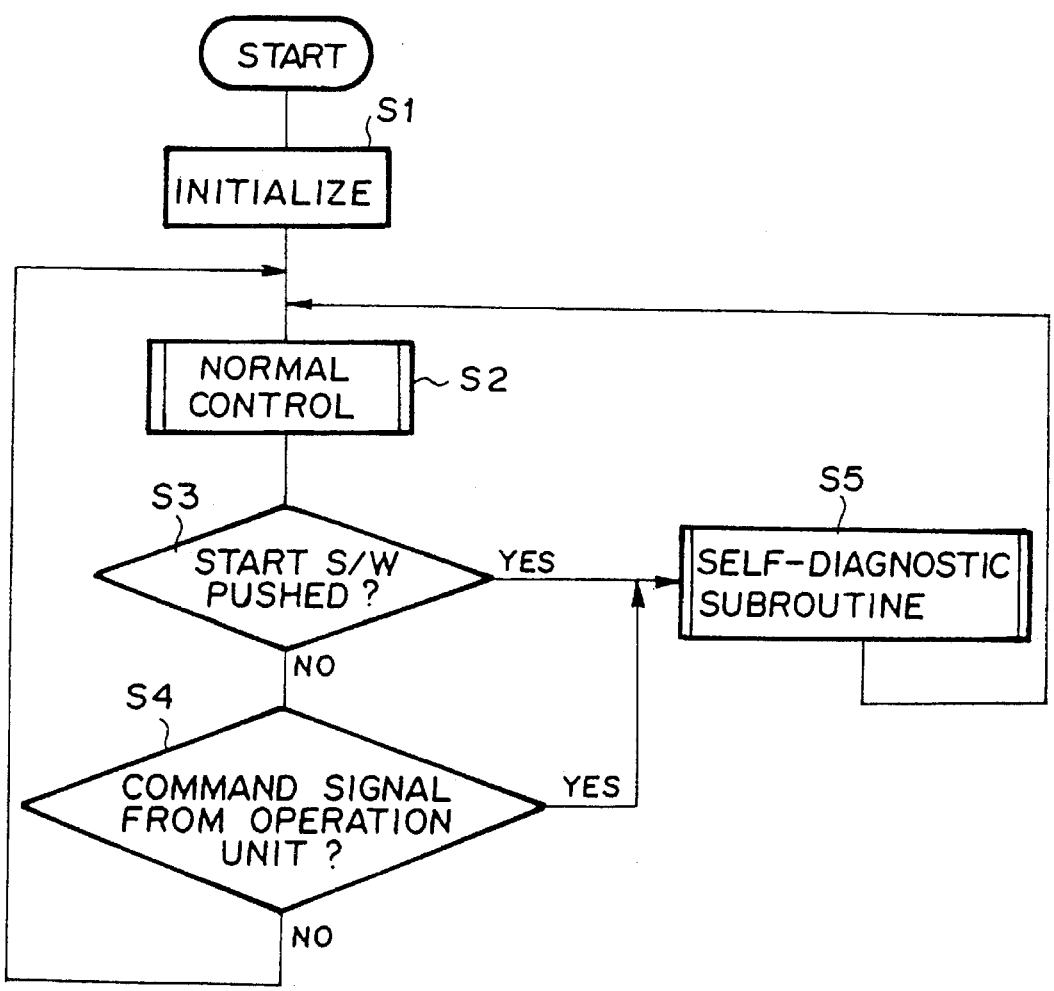
FIG. 5 is a flow chart for illustrating the main routine of the CPU.

FIG. 5 shows the main routine to be executed by the CPU to control the lens unit 10. After initialization in step S1, the CPU effects the normal control of the movable mechanisms according to the command from the camera body 100 (step S2). In the normal control, the CPU moves the focusing lens, the zoom lens, the extender or the like to a desired position, changes the position of the iris in response to the movement of the lens, and outputs data on the movable mechanism to the camera body 100.

The CPU interrupts the normal control periodically and determines in step S3 whether the start button 73 on the self-diagnostic interface board 21 is pushed down and in step S4 whether the signal commanding the diagnosis (the designation signal) is input from the operation unit 41. When it is determined in step S3 that the start button 73 is pushed down or when it is determined in step S4 that the signal commanding the diagnosis is input from the operation unit 41, the CPU executes the self-diagnostic subroutine in step S5 and otherwise returns to the main routine.

Figure 6:
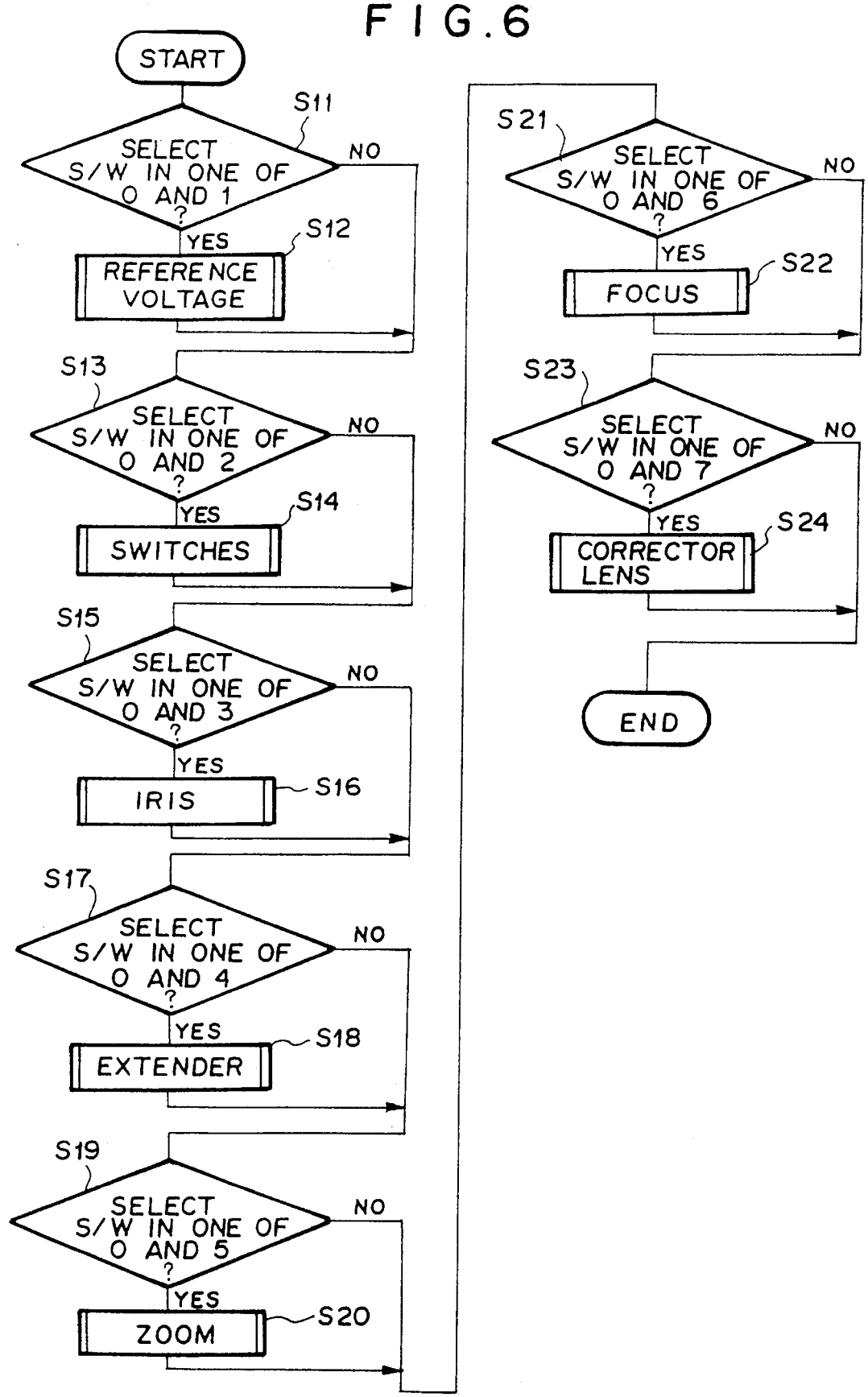
FIG. 6 is a flow chart for illustrating the self-diagnostic subroutine.

The self-diagnostic subroutine will be described with reference to the flow chart shown in FIG. 6, hereinbelow. In the flow chart, it is assumed that the designation signal is input from the self-diagnostic interface board 21.

The CPU first determines whether the selector switch 77 is one of positions 0 and 1. (step S11) Since all the movable mechanisms and the power source are to be checked when the selector switch 77 is in position 0 and the reference voltage and the output current of the power source are to be checked when the selector switch 77 is in position 1, the CPU executes a subroutine for checking the reference voltage when it is determined that the selector switch 77 is one of positions 0 and 1. (step S12) After step S12 or when it is determined that the selector switch 77 is neither in position 0 nor position 1, the CPU determines whether the selector switch 77 is one of positions 0 and 2. (step S13) Since operation of the switches is to be checked when the selector switch 77 is in position 2, the CPU executes a subroutine for checking operation of the switches when it is determined that the selector switch 77 is one of positions 0 and 2. (step S14) After step S14 or when it is determined that the selector switch 77 is neither in position 0 nor position 2, the CPU determines whether the selector switch 77 is one of positions 0 and 3. (step S15) Since the iris is to be checked when the selector switch 77 is in position 3, the CPU executes a subroutine for checking the iris when it is determined that the selector switch 77 is one of positions 0 and 3. (step S16) After step S16 or when it is determined that the selector switch 77 is neither in position 0 nor position 3, the CPU determines whether the selector switch 77 is one of positions 0 and 4. (step S17) Since the extender lens is to be checked when the selector switch 77 is in position 4, the CPU executes a subroutine for checking the extender lens when it is determined that the selector switch 77 is one of positions 0 and 4. (step S18) After step S18 or when it is determined that the selector switch 77 is neither in position 0 nor position 4, the CPU determines whether the selector switch 77 is one of positions 0 and 5. (step S19) Since the zoom lens is to be checked when the selector switch 77 is in position 5, the CPU executes a subroutine for checking the zoom lens when it is determined that the selector switch 77 is one of positions 0 and 5. (step S20) After step S20 or when it is determined that the selector switch 77 is neither in position 0 nor position 5, the CPU determines whether the selector switch 77 is one of positions 0 and 6. (step S21) Since the focusing lens is to be checked when the selector switch 77 is in position 6, the CPU executes a subroutine for checking the focusing lens when it is determined that the selector switch 77 is one of positions 0 and 6. (step S22) After step S22 or when it is determined that the selector switch 77 is neither in position 0 nor position 6, the CPU determines whether the selector switch 77 is one of positions 0 and 7. (step S23) Since the corrector lens is to be checked when the selector switch 77 is in position 7, the CPU executes a subroutine for checking the corrector lens when it is determined that the selector switch 77 is one of positions 0 and 7. (step S24) After step S24 or when it is determined that the selector switch 77 is neither in position 0 nor position 7, the CPU returns to step S2 in the main routine.

In this manner, all the movable mechanisms and the power source are checked in sequence when the selector switch 77 is in position 0, and when the selector switch 77 is in one of the positions 1 to 7, only the part corresponding to the position is checked.

Thus in this embodiment, the operator can easily select the part to be checked by operation of the selector switch 77 or the operation unit 41. Further since the operator can select any one of the parts depending on the frequency at which a particular part had trouble in the past, the situation at that time and the like, checking of the lens unit 10 can be effected with a high efficiency.

Figure 7:
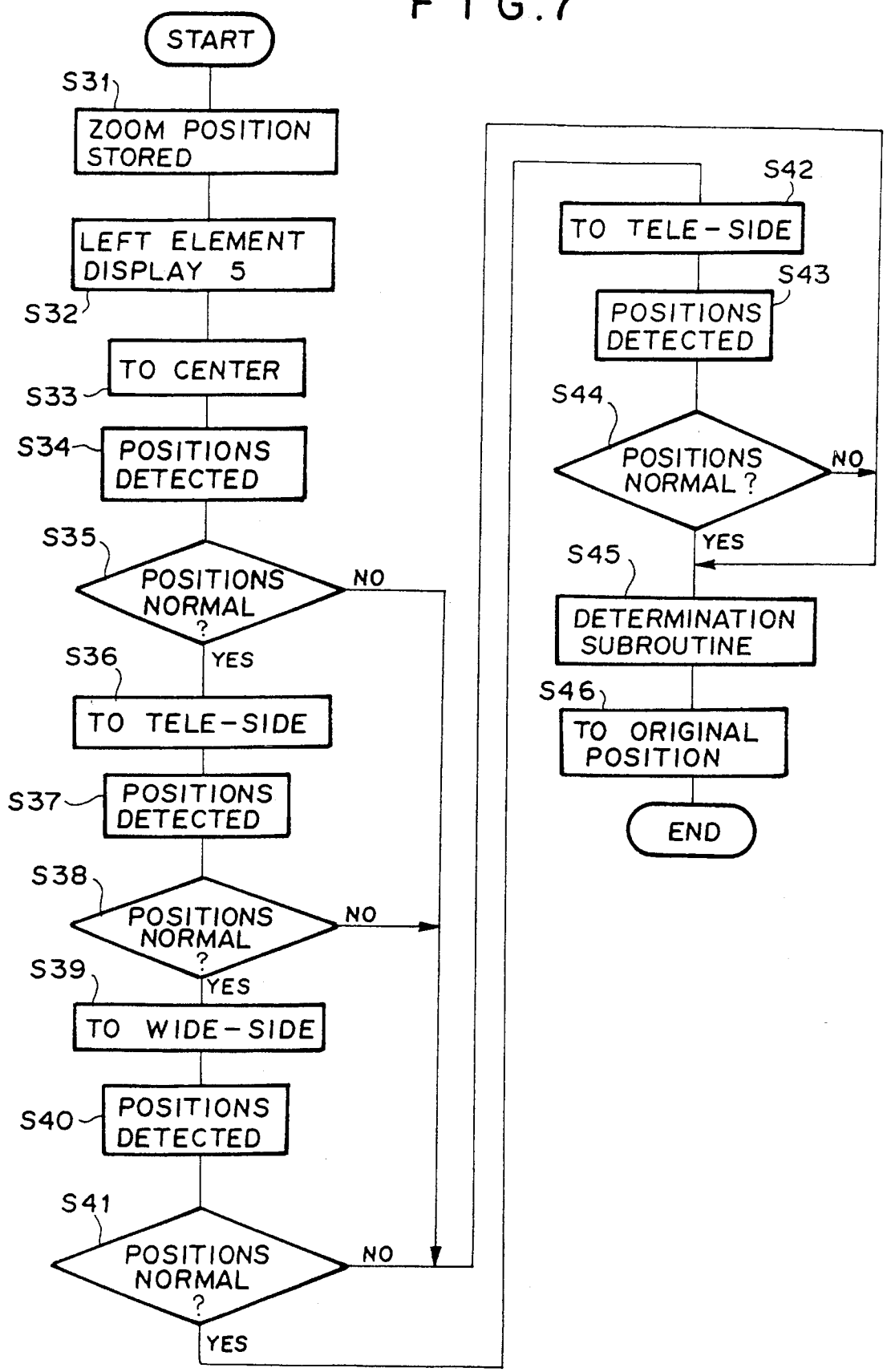
FIG. 7 is a flow chart for illustrating the subroutine for checking the zoom lens.

The subroutine for checking the zoom lens (step S20 in FIG. 6) will be described with reference to the flow chart shown in FIG. 7, hereinbelow.

The CPU first stores data on the current position of the zoom lens (step S31) and then causes the left display element 81a of the diagnostic item display section 81 to display digit 5 to indicate that the zoom lens is being checked (step S32). Then the CPU moves the zoom lens to the center between the tele-side end and the wide-side end (step S33). By always beginning the diagnosis from the center, stability of the diagnosing accuracy is ensured.

While the zoom lens is moving to the center and at the center, the position of the zoom lens is detected by the potentiometer, for instance, at regular intervals (step S34) and it is determined whether positions of the zoom lens are normal (step S35). Whether the positions are normal is determined by comparison of position data obtained with reference position data.

When it is determined in step S35 that the positions of the zoom lens are not normal, the CPU sets predetermined flags and executes a determination subroutine in step S45 (to be described later).

When it is determined in step S35 that the positions of the zoom lens are normal, the CPU moves the zoom lens to the tele-side end and while the zoom lens is moving to the tele-side end and at the tele-side end, the position of the zoom lens is detected by the potentiometer at regular intervals. (steps S36 and S37) Then it is determined whether positions of the zoom lens are normal (step S38). When it is determined in step S38 that the positions of the zoom lens are not normal, the CPU sets predetermined flags and executes the determination subroutine in step S45.

When it is determined in step S38 that the positions of the zoom lens are not normal, the CPU sets a predetermined flag and executes a determination subroutine for determining whether the zoom lens has trouble in step S45.

Thereafter the zoom lens is moved to the wide-side end and then is moved to the tele-side end while the position of the zoom lens is detected and whether the positions are normal is determined in the similar manner. (steps S39 to S44) And each time the positions of the zoom lens are determined not to be normal, predetermined flags are set and the determination subroutine is executed in step S45. Further, the drive current of the motor is also detected at each position of the zoom lens and whether the drive current is normal is determined, and predetermined flags are set when it is determined that the drive current is not normal. In the determination subroutine in step S45, a trouble extent determining subroutine shown in FIG. 8 for determining the extent of the trouble found and a trouble condition determining subroutine shown in FIG. 9 for determining the sub-unit in which trouble is found are executed in parallel.

After the determination subroutine, the zoom lens is returned to the original position where the zoom lens was before initiation of the diagnosis. (step S46) By returning the zoom lens to the original position, the picture taking operation before the diagnosis can be easily resumed without largily adjusting the zoom lens.

The determination subroutine in step S45 will be described with reference to the flow charts shown in FIGS. 8 and 9, hereinbelow. The CPU makes the determinations in the flow charts on the basis of the flags set as described above.

The trouble extent determining subroutine, which determines the magnitude or range of the trouble, will be first described with reference to FIG. 8, hereinbelow.

Figure 8:
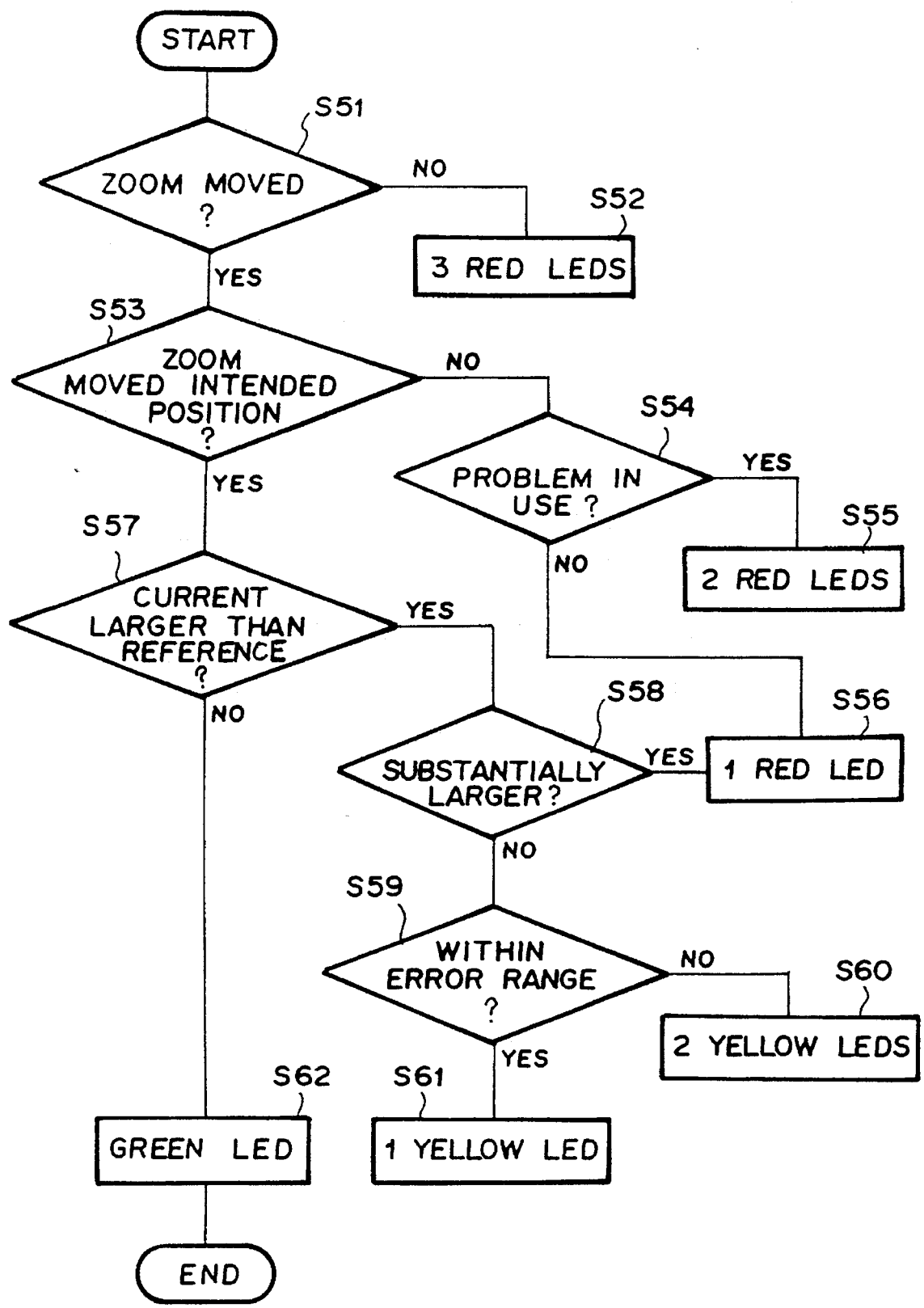
FIG. 8 is a flow chart for illustrating the trouble extent determining subroutine.

In FIG. 8, the CPU determines in step S51 whether the zoom lens moved. When it is determined that the zoom lens did not move, which is a serious trouble, the CPU outputs a predetermined signal to the LED driver (not shown) to turn on three of the red LEDs. (step S52) Otherwise, the CPU determines in step S53 whether the zoom lens moved to the intended position. When it is determined that the zoom lens did not move to the intended position, the CPU determines in step S54 whether it will give rise to a problem in practical use. When it is determined that it will give rise to a problem in practical use, which is a substantial trouble, the CPU outputs a predetermined signal to the LED driver to turn on two of the red LEDs. (step S55) Otherwise, the CPU outputs a predetermined signal to the LED driver to turn on one of the red LEDs. (step S56)

When it is determined in step S53 that the zoom lens moved to the intended position, the CPU determines in step S57 whether the drive current was larger than a predetermined reference value. When it is determined that the former was larger than the latter, the CPU determines in step S58 whether the difference between the former and the latter was large. When it is determined that the difference was large, the CPU outputs the signal to the LED driver to turn on one of the red LEDs. (step S56) Otherwise the CPU determines in step S59 whether the difference was substantially within the range of detecting error, and if NO, the CPU causes the LED driver to turn on both the yellow LEDs (step S60) and otherwise the CPU causes the LED driver to turn on one of the yellow LEDs (step S61).

When it is determined in step S57 that the drive current was not larger than the predetermined reference value, the CPU determines that the zoom lens is in the normal state and causes the LED driver to turn on the green LED. (step S62)

The trouble condition determining subroutine which determines the mode or source of the trouble, will be described with reference to FIG. 9, hereinbelow.

Figure 9:
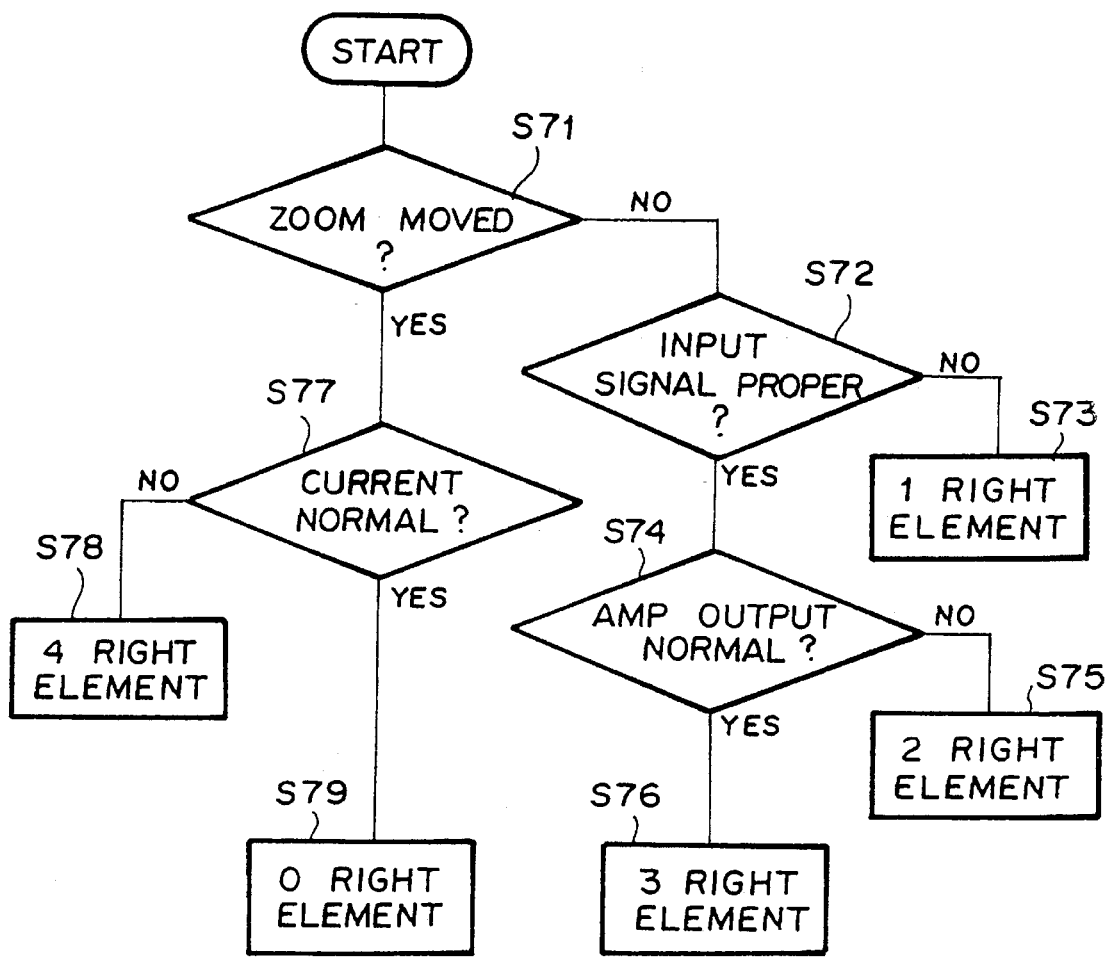
FIG. 9 is a flow chart for illustrating the trouble modality determining subroutine.

In FIG. 9, the CPU first determines in step S71 whether the zoom lens moved. When it is determined that the zoom lens did not move, the CPU determines in step S72 whether the input signal was proper. When it is determined that the input signal was not proper, the CPU causes the LED driver to control the right display element 81b of the diagnostic item display section 81 to display digit 1, which indicates that the input signal generating circuit has trouble. (step S73) Otherwise the CPU determines in step S74 whether the output of the amplifier was normal. When it is determined that the output of the amplifier was not normal, the CPU causes the LED driver to control the right display element 81b to display digit 2, which indicates that the amplifier has trouble. (step S75) Otherwise the CPU causes the LED driver to control the right display element 81b to display digit 3, which indicates that the motor has trouble. (step S76)

When it is determined in step S71 that the zoom lens moved, the CPU determines in step S77 whether the value of the current was normal. When it is determined that the value of the current was not normal, the CPU causes the LED driver to control the right display element 81b to display digit 4, which indicates that the mechanical part has trouble. (step S78) Otherwise the CPU causes the LED driver to control the right display element 81b to display digit 0, which indicates that the zoom lens is in the normal state. (step S79)

Since diagnosis on the other parts are made in the similar manner and will not be described here.

Thus in this embodiment, the operator can easily know at a glance the part having trouble and the sub-unit having trouble from the digits displayed by the left and right display elements 81a and 81b of the diagnostic item display section 81, and can quickly adjust or repair the lens unit 10.

Further the operator can know at a glance whether the lens unit 10 should be immediately adjusted or repaired from the color and the number of the lighting LEDs.

It is preferred that when a serious trouble is found during the self-diagnostic subroutine, the operator immediately interrupts the self-diagnostic subroutine and awaits repair.

The TV camera lens diagnostic system of the embodiment may be variously modified.

For example, though in the embodiment described above, whether each part has trouble and the extent of the trouble are indicated by selectively turning on the red, yellow and green LEDs, the LEDs may have other colors. Further the extent of trouble may be indicated by an FL meter frequently used in an audio system or by a digit, sign, letter or the like.

Further, the part currently checked and the condition of the trouble found may be indicated by signs, letters and the like. Various display elements other than the seven-segment LED display element may be used to indicate the trouble information. For example, a liquid crystal display element may be used.

Further the trouble information described above may be indicated by an acoustic representation such as the length, number and the like of buzzer sound.

Though in the embodiment described above, the part to be checked is selected by use of a DIP type selector switch, other types of changeover switch may be used instead of the DIP type selector switch. Further, though in the embodiment described above, selection is limited to only one of or all the parts, it is possible to group the parts and to arrange the system so that the diagnosis can be made on the selected group.

By cutting the drive signals for driving the parts in the lens unit 10 from the camera body during the diagnosis, fluctuation in the current during the diagnosis can be suppressed, thereby ensuring stability of diagnostic accuracy.

Now another embodiment of the present invention will be described with reference to FIGS. 10 to 13, hereinbelow.

Figure 10:
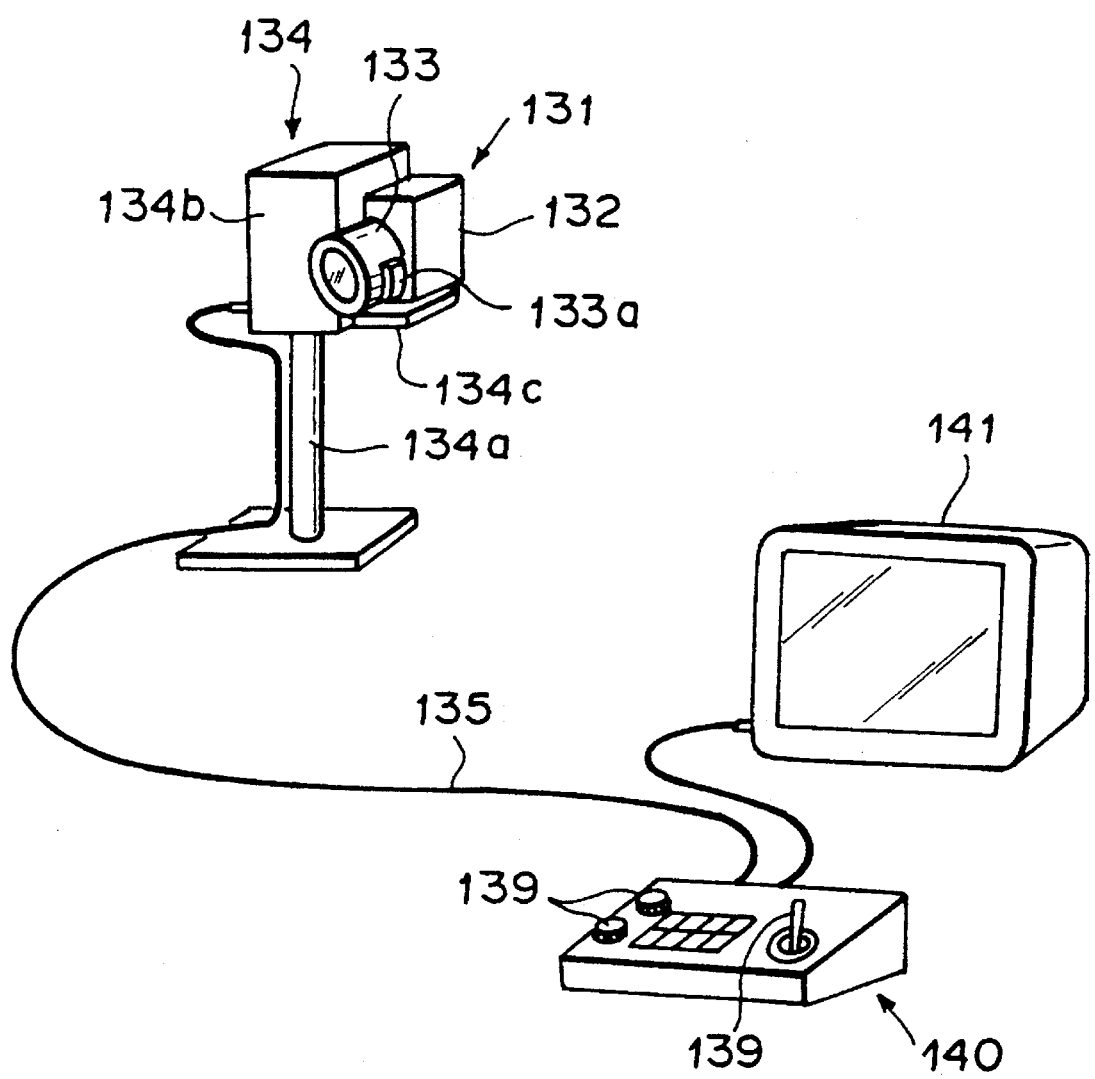
FIG. 10 is a schematic view showing a TV camera remote control system to which the television camera lens diagnostic system in accordance with a second embodiment of the present invention is applied.

In FIG. 10, a TV camera 131 comprises a camera body 132 and a lens unit 133 and is supported on a support table 134c of a pan head 134 to be panned and tilted. The pan head 134 has a leg portion 134a and a body portion 134b mounted on the leg portion 134a to be panned left and right relative to the leg portion 134a. The support table 134c is mounted on the pan head 134 to be tilted up and down relative to the pan head 134. A servo mechanism (not shown) for driving the body portion 134b and the support table 134c is provided in the body portion 134b.

The lens unit 133 is provided with a drive portion 133a formed by a servo mechanism (not shown) driving a zoom mechanism, a focusing mechanism and the like.

Further the lens unit 133 is provided with a CPU 111 (FIG. 11) for checking the state of operation of the mechanisms in the lens unit 133.

An operation unit 140 is provided remote from the TV camera 131 and is connected to the camera 131 and the pan head 134 through a public telephone circuit 135 to remote-control them. That is, various command signals are input into the camera 131 and the pan head 134 in response to operator's control of various control members 39 provided in the operation unit 140 such as a joy stick, a zoom switch, a focusing dial, a speed adjusting member and the like and communication signals such as a confirmation signal are output from the camera 131 and the pan head 134 to the operation unit, whereby the camera 131 is panned and tilted and the zoom mechanism and the focusing mechanism in the lens unit 133 are driven.

An CRT 141 is connected to the operation unit 140 and the picture taken by the camera 131 is displayed thereon.

Figure 11:
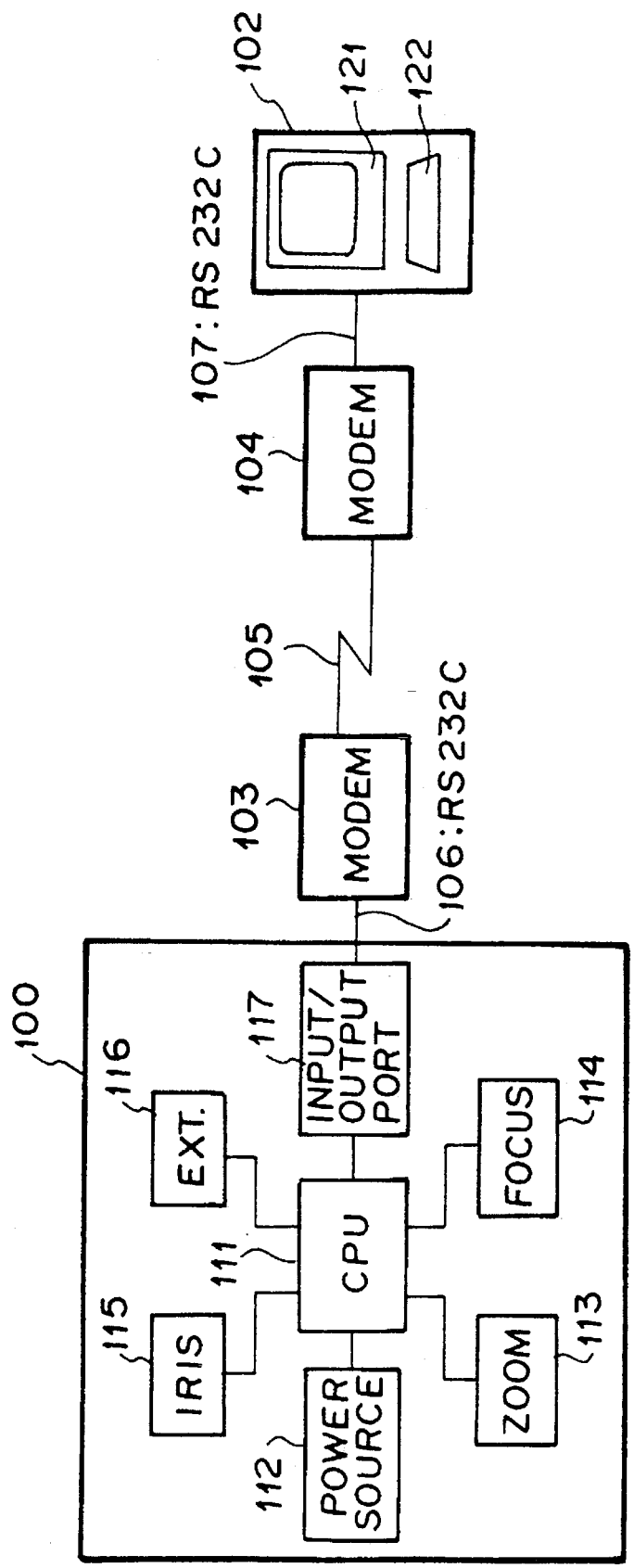
FIG. 11 is a block diagram for illustrating the arrangement of the television camera lens diagnostic system in accordance with the second embodiment.

FIG. 11 shows a diagnostic system in accordance with a second embodiment of the present invention.

As shown in FIG. 11, the CPU 111 in the lens unit 133 is connected to a power source 112 for supplying a reference voltage, a zoom lens drive portion 113, a focusing lens drive portion 114, an iris drive portion 15, an extender drive portion 116 and an input/output port 117.

A MODEM 103 is connected to the input/output port 117 through a RS232C cable 106. A MODEM 104 is connected to a controller 102 through a a RS232C cable 107. The MODEMs 106 and 107 are connected to each other through a public telephone circuit 105.

The controller 102 comprises a CRT 121 and a personal computer 122. The CRT 121 may double as the CRT 141 connected to the operation unit 140 shown in FIG. 10, and the computer 122 may be incorporated in the operation unit 140.

When a diagnosis command is input into the computer 122 by an operator, the command signal is transmitted to the CPU 111 through the cable 107, the MODEM 104, the public telephone circuit 105, the MODEM 103, the cable 106 and the input/output port 117.

Upon receipt of the command signal, the CPU 111 outputs diagnostic action start signals to the respective drive portions 113 to 116, and the drive portions 113 to 116 begin to make the respective diagnostic actions. At the same time, in the drive portions 113 to 116, data on the positions of the movable parts are detected by potentiometers at predetermined sampling timings during the diagnostic action and data on the motor drive currents are detected at the predetermined sampling timings during the diagnostic action. These data are input into the CPU 111.

The power source 112 supplies a reference voltage used in the lens unit 133 and the reference voltage is transmitted to the CPU 111.

The position data, the drive current data and the reference voltage data are transmitted from the CPU 111 to the MODEM 103 through the input/output port 117 and the cable 106. Then these data are transmitted from the MODEM 103 to the personal computer 122 in the controller 102 through the public telephone circuit 105, the MODEM 104 and the cable 107.

The personal computer 122 compares the data input with reference data and determines that the drive portions 113 to 116 are normal when the data input substantially conform to the reference data. When personal computer 122 determines that the drive portions 113 to 116 are normal, it displays the fact on the CRT 121. When the personal computer 122 determines that one or more of the drive portions 113 to 116 has trouble, it displays the fact, the cause of the trouble and the like obtained by the analysis on the CRT 121.

Thus in this embodiment, even if the camera 131 is disposed in a position which is difficult to access, the operator can check the operation of the lens unit 133 easily and constantly in the position where the controller 102 is positioned.

The operation for checking the zoom lens in this embodiment will be described with reference to the flow chart shown in FIG. 12, hereinbelow.

Whether the reference voltage from the power source 112 is of a predetermined value is first determined by the CPU 111. (step S101) When it is determined that the reference voltage is not of the predetermined value, the value of the reference voltage is output through the input/output port 117, and otherwise, a value K (e.g., 2 or 3) is input into a processing count counter (step S102). Then the zoom lens is moved to the tele-side (step S103), and while the zoom lens is moving, position data from the potentiometer of the drive motor are input into the CPU 111 at predetermined sampling timings (step S104) and drive current data on the drive motor are input into the CPU 111 at predetermined sampling timings (step S105). After the zoom lens reaches the tele-side end, the zoom lens is moved toward the wide-side (step S106), and while the zoom lens is moving, position data from the potentiometer of the drive motor are input into the CPU 111 at predetermined sampling timings (step S107) and drive current data on the drive motor are input into the CPU 111 at predetermined sampling timings (step S108). Then the count of the processing count counter is subtracted by 1 (step S109) and it is determined whether the count of the processing count counter is 0 (step S110). Thus steps S103 to S110 are repeated until the count of the processing count counter becomes 0. When the count of the processing count counter becomes 0, the data input into the CPU 111 and stored in a memory (not shown) by that time are output through the input/output port 117.

The reason why steps S103 to S110 are repeated is to prevent detecting errors.

The data output from the input/output port 117 is transmitted to the personal computer 122 through the public telephone circuit and the personal computer 122 determines whether the operation of the zoom lens drive portion 113 is normal in the manner described above.

The operation for checking the iris mechanism in this embodiment will be described with reference to the flow chart shown in FIG. 13, hereinbelow.

Figure 12:
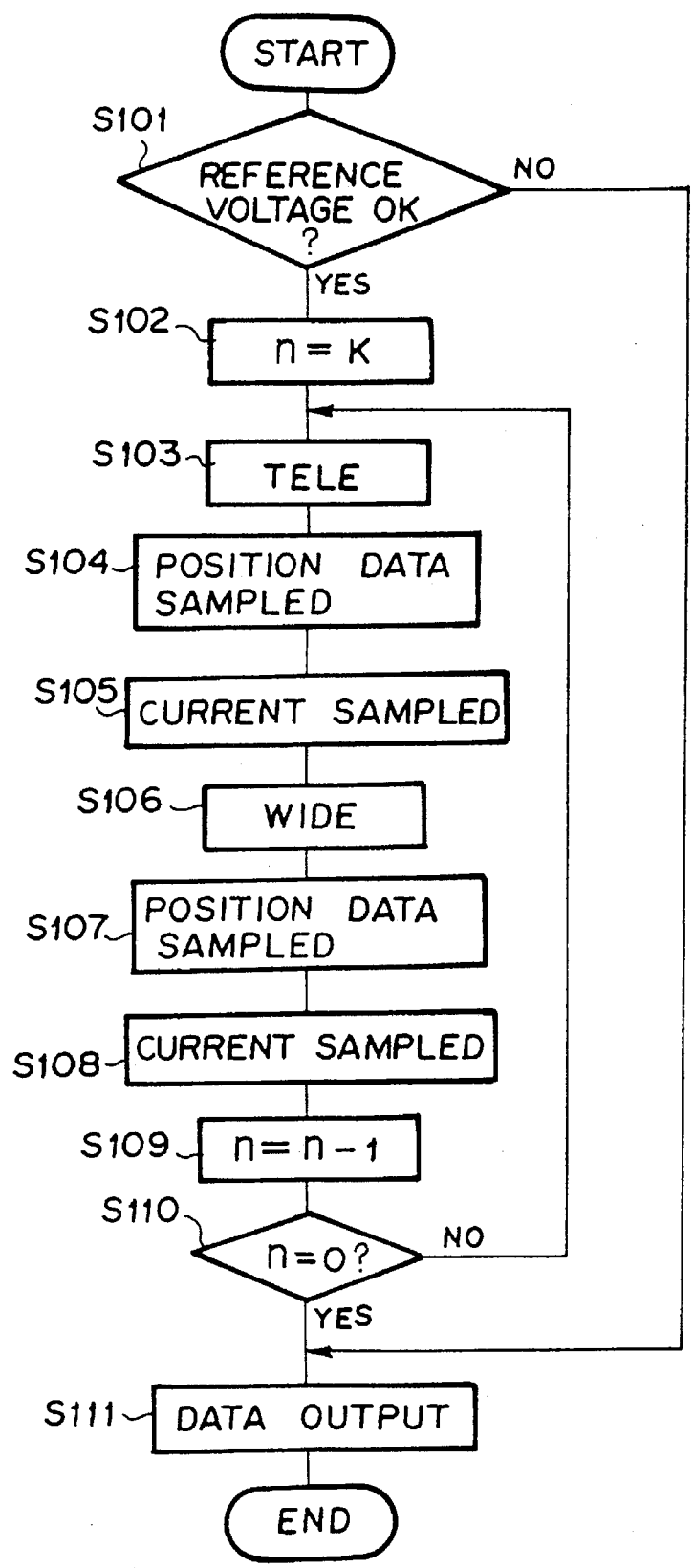
FIG. 12 is a flow chart for illustrating the operation for checking the zoom lens.
Figure 13:
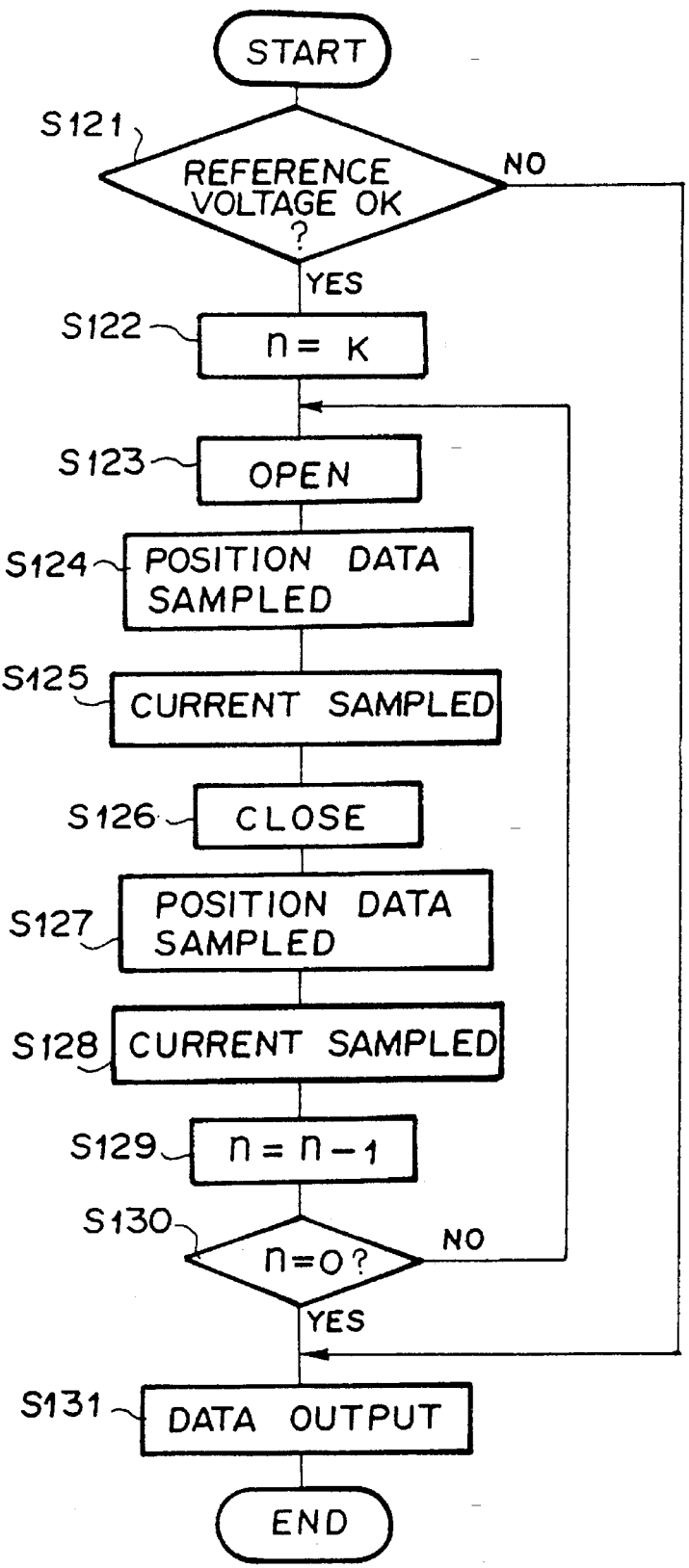
FIG. 13 is a flow chart for illustrating the operation for checking the iris drive mechanism.

The flow chart shown in FIG. 13 is substantially the same as that shown in FIG. 12 except that the iris is opened in step S123 instead of moving the zoom lens to the tele-side in step S103 and is closed in step S126 instead of moving the zoom lens to the wide-side in step S106.

Further the operation for checking the focusing mechanism is also the same as that for checking the zoom lens except that the focusing lens is moved to the infinity and to the shortest range instead of moving the zoom lens to the tele-side and to the wide-side.

Also the operation for checking the extender drive mechanism is substantially the same as that for checking the zoom lens.

The diagnostic system of this embodiment may be variously modified.

For example, though, in the embodiment described above, the data input in the CPU 111 are transmitted to the personal computer 122 remote from the camera 131 and the personal computer 122 diagnoses the drive mechanisms 113 to 116, the diagnosis may be made by the CPU 111 and the result of the diagnosis may be transmitted to the controller 102 or may be displayed on a display portion provided on the camera body 132.

Further the communication between the CPU 111 and the controller 102 may be made through other communication means such as wire telecommunication means like GP-IB, radio communication means, light communication means and the like.

What is claimed is:

1. A television camera lens diagnostic system for diagnosing the state of operation of a movable mechanism in a lens unit for a television camera, comprising:

start signal generating means for generating a start signal for initiating a diagnosis;

diagnostic action commanding means connected to the start signal generating means and the movable mechanism for receiving the start signal and in response automatically commanding the movable mechanism to make a predetermined test movement;

detecting means associated with the movable mechanism for detecting said test movement of the movable mechanism and generating a detection signal containing information about the detected test movement;

determining means connected to said detecting means and said diagnostic action commanding means for receiving said detection signal, storing reference data defining the test movement, comparing the detected test movement to said reference data defining the test movement, determining whether there is an operational problem in the movable mechanism based on said comparison, and generating an output signal when there is an operational problem in the movable mechanism; and indicating means connected to the determining means for receiving said output signal and identifying the movable mechanism having an operational problem.

2. The television camera lens diagnostic system of claim 1 wherein said indicating means further comprises mode determining and indicating means for determining and indicating a modality of the operational problem.

3. The television camera lens diagnostic system of claim 2 wherein said indicating means further comprises significance determining and indicating means for determining a significance level of the operational problem and for indicating the significance level of the operational problem.

4. The television camera lens diagnostic system of claim 3 wherein said significance indicating means comprises a plurality of indicating lamps, and said significance indicating means indicates the significance of the operational problem by the number of said lamps which are turned on.

5. The television camera lens diagnostic system of claim 3 wherein said indicating means comprises a diagnostic item display and identifies the movable mechanism having an operational problem by displaying at least one digit corresponding to that movable mechanism.

6. The television camera lens diagnostic system of claim 1 wherein there are a plurality of movable mechanisms in the lens unit for the television camera, and wherein said diagnosis action commanding means, said detecting means, and said determining means sequentially test the plurality of movable mechanisms and said indicating means indicates the movable mechanism which is being tested during the test of that mechanism.

7. The television camera lens diagnostic system of claim 6 in which said indicating means comprises a digital display and identifies the part of the movable mechanism having an operational problem by displaying at least one digit corresponding to said part.

8. The television camera lens diagnostic system of claim 1 wherein said lens unit is controlled by a remote controller and said start signal generating means and the indicating means are provided in the remote controller.

9. The television camera lens diagnostic system of claim 8 wherein said start signal generating means, the determining means and the indicating means are also provided in said remote controller.

10. The television camera lens diagnostic system of claim 1 wherein said diagnostic action commanding means, the detecting means and the determining means are provided on the lens unit, and said start signal generating means and the indicating means are provided in a unit which can be removably mounted on the lens unit.

11. The television camera lens diagnostic system of claim 1 wherein the television camera lens unit being diagnosed has a plurality of movable mechanisms, and wherein the system further comprises selecting means connected to the diagnostic action commanding means for selecting one of said plurality of movable mechanisms to be tested.

12. A television camera lens diagnostic system for diagnosing the state of operation of a movable mechanism in a lens unit for a television camera, the movable mechanism having an electric motor for driving the mechanism and a source of driving current for the electric motor, comprising:

start signal generating means for generating a start signal for initiating a diagnosis;

diagnostic action commanding means connected to the start signal generating means and the movable mechanism for receiving the start signal and in response automatically commanding the movable mechanism to make a predetermined test movement;

detecting means associated with the movable mechanism for detecting said test movement of the movable mechanism and generating a detection signal containing information about the detected test movement;

drive current detection means connected to the source of driving current for detecting the driving current applied to the electric motor of the movable mechanism and generating a drive current indicating signal;

determining means connected to said detecting means, said drive current detection means, and said diagnostic action commanding means for receiving said detection signal and said drive current indicating signal, comparing the detected test movement to reference data defining the test movement, determining whether there is an operational problem in the movable mechanism based on said comparison and based on said drive current, and generating an output signal when there is an operational problem in the movable mechanism; and indicating means connected to the determining means for receiving said output signal and identifying the movable mechanism having an operational problem.

13. A television camera lens diagnostic system for diagnosing the state of operation of a movable mechanism in a lens unit for a television camera, the movable mechanism having a plurality of parts, comprising:

start signal generating means for generating a start signal for initiating a diagnosis;

diagnostic action commanding means connected to the start signal generating means and the movable mechanism for receiving the start signal and in response automatically commanding the movable mechanism to make a predetermined test movement;

detecting means associated with the movable mechanism for detecting said test movement of the movable mechanism and generating a detection signal containing information about the detected test movement;

determining means connected to said detecting means and said diagnostic action commanding means for receiving said detection signal, storing reference data defining the test movement, comparing the detected test movement to the reference data defining the test movement, determining whether there is an operational problem in the movable mechanism based on said comparison, identifying a part of the movable mechanism that has an operational problem, and generating an output signal when there is an operational problem in the movable mechanism indicating that a particular one of the parts of the movable mechanism has an operational problem; and indicating means connected to the determining means for receiving said output signal and, when there is an operational problem, specifically indicating which part of said movable mechanism has an operational problem.

* * * * *